United States Patent [19]

Kuratsuji et al.

[11] 3,952,125

[45] Apr. 20, 1976

[54] ELECTRICALLY INSULATING MATERIAL

[75] Inventors: Takatoshi Kuratsuji; Hiroo Shima; Takeo Shima; Shoji Kawase, all of Iwakuni; Sakae Shimotsuma, Atsugi; Masahiro Hosoi, Sagamihara, all of Japan

[73] Assignee: Teijin Limited, Osaka, Japan

[22] Filed: Aug. 26, 1974

[21] Appl. No.: 500,502

[30] Foreign Application Priority Data

Aug. 30, 1973 Japan ................................ 48-97753

[52] U.S. Cl. ................................ 428/220; 260/757; 428/337

[51] Int. Cl.[2] ........................................ C08G 63/12

[58] Field of Search .................. 260/75 T; 161/165; 428/337, 220

[56] References Cited

UNITED STATES PATENTS 3,466,348 9/1969 Wiener ............................ 260/75 T

FOREIGN PATENTS OR APPLICATIONS 604,073 6/1948 United Kingdom .............. 260/75 T

OTHER PUBLICATIONS

"Polyester," Encyclopedia of Polymer Science and Technology, Vol. 11, pp. 68–87.

*Primary Examiner*—George F. Lesmes
*Assistant Examiner*—Ellis P. Robinson
*Attorney, Agent, or Firm*—Sherman & Shalloway

[57] ABSTRACT

An electrically insulating material composed of an unstretched film of a substantially linear polyester at least 85 mol% of the recurring units of which consist of a hexamethylene naphthalene-2,6-dicarboxylate unit and which has an intrinsic viscosity, as measured on its ortho-chlorophenol solution at 35°C., of at least 0.3.

4 Claims, No Drawings

ELECTRICALLY INSULATING MATERIAL

This invention relates to an electrically insulating material, and more specifically to an electrically insulating material of superior thermal stability which consists of an unstretched film of a polyester containing hexamethylene naphthalene-2,6-dicarboxylate as a main structural unit.

Biaxially oriented polyethylene terephthalate films have been used widely as electrically insulating materials, such as those used in component parts of condensers, electric wires and cables, transformers, and motors. In recent years, biaxially oriented poly(ethylene naphthalene-2,6-dicarboxylate) films having more improved thermal stability have been developed.

Generally, electrically insulating materials in such film form are required to have a high level of thermal stability in addition to the desired electrical insulating properties in view of their safety in actual application, durability and processability. Examination of the thermal stability of the electrically insulating material is made by exposing the material to high temperatures for long periods of time and measuring changes or reduction in its dielectric breakdown voltage, break elongation and strength. The temperature and time that are most commonly used in the art for examination of thermal stability are temperatures of 150° to 200°C., and periods of 100 to 200 hours depending upon the temperatures applied.

Both of the above poly(ethylene terephthalate) or poly(ethylene naphthalene-2,6-dicarboxylate) are crystalline polymers, and films prepared from these polymers, in their unstretched state, have low thermal stability, and are liable to become brittle and break when processing them at high temperatures for incorporation in an electric machinery or appliance as an insulator or as a result of a rise in temperature when using the resulting assembly. Accordingly, these films do not at all pass the above thermal stability test. In order to use the films as feasible electrically insulating material, these unstretched films must be biaxially stretched and heat-set so that their surface area increases at least 10 times.

On the other hand, in actual applications of electrically insulating materials in the film form, especially thick films are required in such component parts as an interphase insulator, a slot or wedge of a transformer or motor. The most frequently required thickness of the film is 250 to 750 microns. However, the maximum thickness of a biaxially stretched polyester film known heretofore is usually about 125 microns. In order to stretch the film biaxially so that the surface area of the film increases to at least 10 times, it is necessary to use an unstretched film having a thickness of at least 10 times. But it is extremely difficult to cool such a thick film uniformly or biaxially stretch it after extrusion. Thus, if it is desired to obtain an electrically insulating material having a thickness of as large as 250 to 750 microns, two or more biaxially stretched thin polyester films must be bonded to each other. Bonding of thin films not only requires an additional step, but also presents various difficult problems such as the selection of a suitable bonding agent, the separation of the bonded assembly into the individual films, and the deterioration of the material caused by it.

It has been found surprisingly that in spite of the fact that poly(hexamethylene naphthalene-2,6-dicarboxylate) is a crystalline polyester, films prepared from this polymer have superior electrical insulation and thermal stability in their untreated state, and can be suitably used as electrically insulating materials. An electrically insulating material composed of the unstretched films in accordance with this invention has the following advantages over those prepared from the conventional biaxially stretched polyester films.

Firstly, since films obtained by ordinary melt-extruding techniques from poly(hexamethylene naphthalene-2,6-dicarboxylate) can be used as electrically insulating materials in their unstretched state, the biaxial stretching step which is essential in the prior art can be omitted. Hence, there is no need to use a stretching machine and a tenter required for biaxial stretching and heat-setting. Thus, the electrically insulating material can be produced with economic advantage.

Secondly, since stretching is not required, a thick film which cannot be obtained with the conventional biaxially stretched film can be provided directly. In other words, while thick electrically insulating materials which have especially brisk demand have been prepared by bonding a plurality of thin films, the need for such a thick electrically insulating material can be fulfilled in this invention by one thick unstretched film. Therefore, the electrically insulating material of this invention does not suffer from disadvantages of the increase in the number of steps or the separation of bonded films from each other.

Thirdly, unstretched films in accordance with this invention have superior thermal stability not only to unstretched films prepared from the conventional polyesters but also to biaxially oriented polyethylene terephthalate film.

The invention will be described below in greater detail.

The electrically insulating material of this invention is composed of an unstretched film of a substantially linear polyester at least 85 mol% of whose recurring units consist of a hexamethylene naphthalene-2,6-dicarboxylate unit and which has an intrinsic viscosity, as measured on its o-chlorophenol solution at 35°C., of at least 0.3. The substantially linear polyester denotes a polyester which is linear to such an extent that it can be extruded into the form of film.

The polyester in which at least 85 mol% the recurring units consist of a hexamethylene naphthalene-2,6-dicarboxylate unit includes not only poly(hexamethylene naphthalene-2,6-dicarboxylate), but also a modified hexamethylene naphthalene-2,6-dicarboxylate polymer modified with not more than 15 mol% of a third component. Generally, the poly(hexamethylene naphthalene-2,6-dicarboxylate) is produced by condensing naphthalene 2,6-dicarboxylic acid or its functional derivative with hexamethylene glycol or its functional derivative in the presence of a catalyst under suitable reaction conditions. The modified polymer may be a copolyester or mixed polyester obtained by adding at least one modifying component before the completion of polymerization for producing poly(hexamethylene naphthalene-2,6-dicarboxylate).

Examples of suitable third components are dicarboxylic acids such as naphthalenedicarboxylic acids (excepting 2,6-isomer), terephthalic acid, isophthalic acid, 2-methyl terephthalic acid, 4-methyl isophthalic acid, dichloroterephthalic acid, dibromoterephthalic acid, diphenyl dicarboxylic acid, diphenyl ether dicarboxylic acid, diphenyl sulfone dicarboxylic acid, diphenoxyethanedicarboxylic acid, adipic acid or sebacic acid, hydroxy-carboxylic acids such as p-β-hydroxyethoxybenzoic acid, functional derivatives of these carboxylic acids, dihydroxy compounds such as ethylene glycol, diethylene glycol, neopentylene glycol, propylene glycol, trimethylene glycol, tetramethylene glycol, decamethylene glycol, cyclohexane dimethylol, hydroquinone, bis(β-hydroxyethoxy) benzene, bisphenol A, tetrabromobisphenol A, di-p-hydroxyphenylsulfone, di-p-(β-hydroxyethoxy) phenyl sulfone, polyoxyethylene glycol, polyoxypropylene glycol, or polyoxytetramethylene glycol, and functional derivatives of these dihydroxy compounds. Compounds having at least 3 ester-forming functional groups, such as glycerine, pentaerithritol, trimethylol propane, trimellitic acid, trimesic acid, or pyromellitic acid, may be used so long as the polymer is substantially linear.

A monofunctional compound such as benzoic acid or naphthoic acid can also be incorporated in the polymer in order to adjust the degree of polymerization or the viscosity of the polymer.

If desired, the above polyester may contain a delusterant such as titanium dioxide, a stabilizer such as phosphoric acid, phosphorus acid, phosphonic acid or esters of these acids, an ultraviolet absorber such as benzophenone derivative, an anti-oxidant, a fire retardant, a slipping agent, a coloring agent, or a filler.

The polyester used in this invention has an intrinsic viscosity, as calculated from the viscosity of an o-chlorophenol solution of the polyester measured at 35°C., of at least 0.3, preferably at least 0.35. If the intrinsic viscosity is lower than 0.30, the strength, toughness and thermal stability of a film prepared from the polyester are reduced, thus failing to achieve the objects of this invention. On the other hand, too high an intrinsic viscosity renders film-formation difficult. Accordingly, the intrinsic viscosity of not more than 2.0 is preferred. Poly(hexamethylene naphthalene-2,6-dicarboxylate) having an intrinsic viscosity of 0.3 has a softening point of about 215°C., and that having an intrinsic viscosity of 2.0 has a softening point of about 212°C.

The unstretched film used in this invention can be prepared by subjecting the poly(hexamethylene naphthalene-2,6-dicarboxylate) or a modified polyester thereof to an ordinary film-forming process such as extrusion molding. Desirably, film-formation is carried out under conditions such that the growth of the crystals in the polymer is inhibited as much as possible. According to a preferred embodiment of film formation, the melt extruded polyester is quenched on a casting drum maintained at the lowest possible temperature, for example, at not more than 30°C., preferably at not more than 25°C. Alternatively by maintaining the drum at a higher temperature, for example, 75 to 200°C., preferably 100° to 180°C., the extruded polyester is solidified while retarding the speed of crystallization of the polyester, and then it is quenched. Auxiliary means for cooling, for example, blowing of air against the unstretched film held at a high temperature using an air knife, or contacting it with a cold liquid, or using chilled rolls, can also be used. The conjoint use of the auxiliary means is preferred especially when casting a thick film.

The thickness of the unstretched film is determined according to the use of the electrically insulating material. But by the above-mentioned method, unstretched films having a thickness of as large as up to about 1000 microns can be prepared. Thus, unstretched films having a thickness of at least about 70 microns, preferably at least about 100 microns, more preferably at least about 150 microns, can be easily prepared, and they can be directly used for electrically insulating materials of the desired thickness. In other words, according to this invention, electrically insulating materials having a thickness of 250 to 750 microns which have especially large demand can be directly provided. If desired, thinner films, for example, those having a thickness of about 5 microns, can be easily prepared.

The electrically insulating material composed of a film of poly(hexamethylene naphthalene-2,6-dicarboxylate) of this invention exhibits superior thermal stability in the unstretched state unlike films composed of other crystalline polyesters. In spite of the fact that the softening point of poly(hexamethylene naphthalene-2,6-dicarboxylate), which is about 213°C., is lower than that of poly(ethylene terephthalate) (about 261°C.) and that of poly(tetramethylene terephthalate) (about 225°C.), even when a film of the poly(hexamethylene naphthalene-2,6-dicarboxylate) is exposed to high temperatures such as 150° to 200°C. for long periods of time, its mechanical and electrical properties are not reduced significantly, and the film has superior thermal stability. In contrast, unstretched films of the other polyesters described above are deteriorated in properties within very short periods of time when exposed to such high temperatures, and become infeasible. Incidentally, the softening points of the polyesters given above are typical values of the polymers in ordinary use.

It can thus be seen that the electrically insulating material of this invention composed of poly(hexamethylene naphthalene-2,6-dicarboxylate) is a material having very superior thermal stability even in the unstretched state. Accordingly, there is no need to stretch it, and the step of biaxially stretching and heat-setting is not required in the film forming step. Thus, this offers an economic advantage. The invention also has the advantage of easily preparing thick films having large demand for use as electrically insulating materials.

The following Examples and Comparative Examples illustrate the present invention more specifically.

Tests on physical properties and their measurements were performed by the following methods.

1. Tensile strength and elongation at break

The tensile mechanical properties are determined in an atmosphere kept at a relative humidity of 65% and a temperature of 23°C. by means of an Instron type tensile tester under the following conditions.

Sample form: (15 cm × 1 cm)
Chuck distance: 10 cm
Pulling speed: 10 cm/min.

The sample was cut out from the film so that the longitudinal direction of the sample corresponded with that of the film.

2. Dielectric breakdown voltage

Measured in accordance with the method of JIS C2318 using a disc electrode with a diameter of 25 mm and elevating the voltage at a rate of 1 KV/sec.

3. Method for heat deteriorating the film

Samples of the form described in paragraph 1 above were cut out so that the longitudinal direction of the sample corresponded with that of the film. They were placed in a gear oven kept at a predetermined temperature, and taken out after a predetermined period of time.

EXAMPLE 1 AND COMPARATIVE EXAMPLES 1 AND 2

Chips of poly(hexamethylene naphthalene-2,6-dicarboxylate) having a softening point of 213°C. and an intrinsic viscosity of 1.24 were melt extruded at 260°C. through a T-die onto a casting drum kept at 25°C., and then quenched and solidified to form an unstretched film having a thickness of 150 microns. The properties of the unstretched film are shown in Table 1 from which it is seen that it has a high dielectric breakdown voltage.

The film was heat deteriorated for a predetermined time in air kept at 160° and 200°C. respectively. The properties of the film before and after the heat-deteriorating test are shown in Table 1. Since the film retained more than 50% of the elongation even after having been heat deteriorated at 200°C. for 100 hours, and there was scarcely any reduction in dielectric breakdown voltage, the film was found to be a superior material for electrically insulating material.

For comparison, 150 micron-thick unstretched films of poly(ethylene terephthalate) and poly(ethylene naphthalene-2,6-naphthalate) were subjected to the same heat-deterioration test. It was found that their elongation was reduced to less than 10% after 100 hours at 160°C., showing marked deterioration.

KV/mm. Deterioration in the elongation of the film was examined at 160°C., and it was found that the film had an elongation of 58% after 100 hours, and 50% after 500 hours. At 200°C., the elongation of the film was 62% after 50 hours, and 50% after 100 hours. Thus, the film was found to be feasible in actual applications. The deteriorated films had a strength of 540 to 570 Kg/cm$^2$ and a dielectric breakdown voltage of 118 to 122 KV/mm, showing hardly any change.

EXAMPLE 3 AND COMPARATIVE EXAMPLES 3 AND 4

Poly(hexamethylene naphthalene-2,6-dicarboxylate) (to be abbreviated to $C_6N$) having an intrinsic viscosity of 0.75 was melt-extruded at 255°C to form an unstretched film having a thickness of 250 microns.

On the other hand, polyethylene terephthalate (to be abbreviated to PET) having an intrinsic viscosity of 0.62 was melted at 280°C. and extruded into an unstretched film having a thickness of about 3.1 mm. The film was then stretched to 3.5 times at 90°C. in the longitudinal direction and then to 3.6 times at 95°C. in the transverse direction, and then heat-treated at 210°C. at constant length to form a biaxially oriented polyethylene terephthalate film having a thickness of 250 microns (Comparative Example 3).

Separately, polyethylene terephthalate having an intrinsic viscosity of 0.62 was extruded into an unstretched film having a thickness of about 1.6 mm with the amount of extrusion being reduced to half, and then a biaxially stretched film having a thickness of 125

Table 1

| Film material and items of measurement | | Before Unit | Deteriorated It 160°C. deterioration | 100 hours | Detwriorated at 200°C 500 hours | 100 hours | ours |
|---|---|---|---|---|---|---|---|
| Poly(hexamethylene naphthalone-2,6-dicarboxylate (Example 1) | | | | | | | |
| Elongation at break | % | 450 | 80 | 75 | 50 | 35 | |
| Strength at break | Kg/cm$^2$ | 690 | 680 | 680 | 700 | 710 | |
| Dielectric breakdown voltage | KV/mm | 150 | 152 | 150 | 150 | 150 | 148 |
| Density | g/cm$^3$ | 1.2330 | 1.2410 | 1.2530 | 1.2530 | 1.2730 | 1.2-740 |
| Poly(ethylene terephthalate) (Comparative Example 1) | | | | | | | |
| Elongation at break | % | 15 | Not measurable because of marked deterioration | | Not measurable because of marked deterioration | | |
| Strength at break | Kg/cm$^2$ | 590 | | | | | |
| Dielectric breakdown voltage | KV/mm | 138 | | | | | |
| Density | g/cm$^3$ | 1.343 | | | | | |
| Poly(ethylene naphthalene-dicarboxylate) (Comparative Example 2) | | | | | | | |
| Elongation at break | % | 140 | Not measurable because of marked deterioration | | Not measurable because of marked deterioration | | |
| Strength at break | Kg/cm$^2$ | 730 | | | | | |
| Dielectric breakdown voltage | KV/mm | 143 | | | | | |
| Density | g/cm$^3$ | 1.337 | | | | | |

EXAMPLE 2

An unstretched film having a thickness of 700 microns was prepared in the same way as in Example 1 except that the melt-extrusion temperature was changed to 265°C., and the amount of the polymer to be extruded from the die was increased to 4.6 times. The film had a strength of 550 kg/cm$^2$, an elongation of 280%, and a dielectric breakdown voltage of 120 microns was formed in the same way as in Comparative Example 2. Two copies of such films were superimposed with the inside confronting surfaces having been previously subjected to corona discharge treatment (5 KV, 3–4 mA), and pressed between two rolls held at 210°C. to form a bonded polyethylene terephthalate film having a thickness of 250 microns (Comparative Example 4). The properties of these films are shown in Table 2.

It can be seen from Table 2 that the unstretched film of poly(hexamethylene naphthalene-2,6-dicarboxylate) film having an intrinsic viscosity of less than 0.3 suffers from a marked reduction in elongation, and thus has poor thermal stability.

Table 2

| Film material and items of measurement | Unit | Before deterioration | Deteriorated at 160°C. 100 hours | 500 hours | Deteriorated at 200°C. 100 hours | 200 hours |
|---|---|---|---|---|---|---|
| unstretched $C_6N$ film, intrinsic viscosity 0.75, thickness 250 microns (Example 3) | | | | | | |
| Elongation at break | % | 300 | 65 | 55 | 68 | 45 |
| Strength at break | Kg/cm² | 600 | 640 | 620 | 610 | 620 |
| Dielectric breakdown voltage | KV/mm | 135 | 132 | 134 | 133 | 135 |
| Biaxially stretched PET film intrinsic viscosity 0.64, thickness 250 microns (comparative Example 3) | | | | | | |
| Elongation at break | % | 130 | 20 | 5 | 010 1* | able because |
| Strength at break | Kg/cm² | 1900 | 100 | 1000 | 850 | of marked |
| Dielectric breakdown voltage | KV/mm | 145 | 143 | 145 | 140 | deterioration |
| Biaxially stretch bonded PET film, intrinsic viscosity 0.64, thickness 125 x 2 (microns) (Comparative Example 4) | | | | | | |
| Elongation at break | % | 125 | 25 | 3 | 1* | not measur- able because |
| Strength at break | KG/cm² | 1850 | 1050 | 950 | 800 | of marked |
| Dielectric breakdown voltage | KV/mm | 143 | 140 | 142 | 135 | deterioration |
| unstretched $C_6N$ film, intrinsic viscosity 0.25, thickness 250 microns (Comparative Example 5) | | | | | | |
| Elongation at break | % | 120 | 35 | 24 | 28 | 8 |
| Strength at break | Kg/cm² | 650 | 670 | 670 | 600 | 520 |
| Dielectric breakdown voltage | KV/mm | 133 | 110 | 95 | 80 | 82 |

*Values obtained after 25 hours.

late) had an elongation of 55% after deterioration for 500 hours at 160°C., whereas the conventional biaxially stretched polyethylene terephthalate film exhibited an elongation of less than 10% after the same heat deterioration test and after 25 hours at 200°C., its elongation was reduced to 1%. The bonded polyethylene terephthalate film also suffered from drastic deterioration in the same way as in the case of one 250 micron thick biaxially stretched polyethylene terephthalate film.

COMPARATIVE EXAMPLE 5

An unstretched film having a thickness of 250 microns was prepared in the same way as in Example 3 from poly(hexamethylene naphthalene-2,6-dicarboxylate) having an intrinsic viscosity of 0.25. The properties of the film are also shown in Table 2. It can be seen from this that a film of poly(hexamethylene naphthalene-2,6-dicarboxylate) film having an intrinsic viscosity of less than 0.3 suffers from a marked reduction in elongation, and thus has poor thermal stability.

What is claimed is:

1. An electrically insulating material composed of an unstretched film having a thickness of from 70 to 1,000 microns of a substantially linear crystalline polyester at least 85 mol% of which recurring units consist of a hexamethylene naphthalene-2,6-dicarboxylate unit and which has a softening point of from about 212° to about 215°C and an intrinsic viscosity, as measured on its ortho-chlorophenol solution at 35°C., of 0.3 to 2.0.

2. The electrically insulating material of claim 1 wherein said polyester has an intrinsic viscosity of at least 0.35.

3. The electrically insulating material of claim 1 wherein the thickness of the film is 100 to 1000 microns.

4. The electrically insulating material of claim 1 wherein the thickness of the film is 250 to 750 microns.

* * * * *